United States Patent
Fahmi

(10) Patent No.: US 6,865,183 B1
(45) Date of Patent: Mar. 8, 2005

(54) F5-TO-F4 OAM ALARM NOTIFICATION AND CELL GENERATION IN MULTIPLE CONNECTION ATM SWITCHES

(75) Inventor: Maher Nihad Fahmi, Port Moody (CA)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/465,339

(22) Filed: Dec. 17, 1999

(51) Int. Cl.[7] .............................................. H04L 12/28
(52) U.S. Cl. .................. 370/395.31; 370/397; 370/399; 370/395.1
(58) Field of Search ................................. 370/389, 390, 370/392, 395.1, 397, 399, 395.3, 395.31, 395.32, 235, 236, 236.2, 232, 409, 410, 401, 402; 709/239, 240

(56) References Cited

U.S. PATENT DOCUMENTS

| | | | | |
|---|---|---|---|---|
| 5,414,701 A | * | 5/1995 | Shtayer | 370/395 |
| 5,546,387 A | * | 8/1996 | Larsson et al. | 370/392 |
| 5,838,924 A | * | 11/1998 | Anderson | 709/229 |
| 5,974,045 A | * | 10/1999 | Ohkura | 370/395 |
| 6,023,467 A | * | 2/2000 | Abdelhamid | 370/395 |
| 6,034,958 A | * | 3/2000 | Wicklund | 370/395 |
| 6,046,996 A | * | 4/2000 | Hoshino et al. | 370/392 |
| 6,087,726 A | * | 7/2000 | Hsia et al. | 257/751 |
| 6,094,685 A | * | 7/2000 | Greenberg et al. | 709/227 |
| 6,198,726 B1 | * | 3/2001 | Hayami | 370/236 |
| 6,327,261 B1 | * | 12/2001 | Makoua | 370/392 |

* cited by examiner

Primary Examiner—Douglas Olms
Assistant Examiner—Ricardo M. Pizarro
(74) Attorney, Agent, or Firm—Oyen Wiggs Green & Mutala

(57) ABSTRACT

A method of identifying a segment and end-to-end OAM flow VPC context table for one of a plurality of VCCs corresponding to the VPC. Each VCC has a context table. Each VCC context table has a pointer. The pointer contains the address of the context table for the segment and end-to-end OAM flow VPC. Provisioned connections supported by the ATM switching system are repeatedly scanned. If a VCC has an active F4-to-F5 OAM process, the pointer is extracted from that VCC's context table, identifying the context table of the corresponding segment and end-to-end OAM flow VPC. If the VPC is in the VP-AIS alarm state, the current VCC outputs a VCC-AIS cell. A continuity check is repeatedly performed by updating the appropriate F4 OAM connection context table whenever a VCC cell is received on a corresponding F5 connection, preventing the F4 connection from raising a continuity check alarm.

4 Claims, 5 Drawing Sheets

F5-TO-F4 OAM ALARM NOTIFICATION AND CELL GENERATION IN MULTIPLE CONNECTION ATM SWITCHES

TECHNICAL FIELD

This invention pertains to OAM alarm notification and cell generation to all F5 (VCC) connections associated with an F4 (VPC) connection in an ATM system, when the F4 connection enters an alarm state. Stringent temporal requirements of alarm notification and cell generation specified by the ITU-T I.610 and GR-1248-CORE standards are satisfied for a potentially large number of connections supported by a single ATM switch.

BACKGROUND

A common requirement in an asynchronous transfer mode ("ATM") switching system is support for termination of a virtual path connection ("VPC" or "F4 connection") into its associated virtual channel connections ("VCC" or "F5 connection"). Such termination necessitates support for operations, administration and management ("OAM") alarm notification and cell generation in accordance with the ITU-T I.610 and GR-1248-CORE standards. Specifically, if an F4-AIS ("Alarm Indication Status") cell is received, that cell is terminated and a VP-AIS alarm is raised. Within 500 milliseconds ("msec") of the F4 connection receiving the AIS cell (and subsequently declaring the VP-AIS alarm state), all F5 connections associated with that F4 connection must generate a VCC-AIS cell downstream. The F5 connections must then generate VCC-AIS cells at a rate of one per second until the F4 connection exits the VP-AIS alarm condition.

Prior art F5-T0-F4 OAM alarm notification and cell generation techniques have been implemented by means of specialized software. However, a potentially large number of connections may be supported by a single ATM switch. Prior art software based techniques are incapable of maintaining compliance with the standards' stringent time limits for large numbers of connections in terms of alarm notification and OAM cell generation. It is accordingly apparent that OAM support for F4 termination cannot be managed by software but must be managed by special hardware provided at the ATM Layer. This is facilitated by the present invention.

SUMMARY OF INVENTION

In accordance with the preferred embodiment, the invention provides a method of identifying a segment and end-to-end OAM flow VPC context table for any one of a plurality of VCCs corresponding to the VPC. This is accomplished by providing a context table for each VCC. A pointer is provided in each VCC context table. The pointer contains the address of the context table for the segment and end-to-end OAM flow VPC.

Once every 500 msec, all provisioned connections supported by the ATM switching system are scanned. In the case of a VCC having an active F4-to-F5 OAM process, the aforementioned pointer is extracted from that VCC's context table, thereby identifying the context table of the corresponding segment and end-to-end OAM flow VPC. If the VPC is in the VP-AIS alarm state, then the current VCC is caused to output a VCC-AIS cell.

A continuity check is performed once every 1,000 msec by updating the "CCcount" field in the appropriate F4 OAM connection context table whenever a VCC cell is received on a corresponding F5 connection, preventing the F4 connection from raising a continuity check alarm ("CCalarm"). A similar check is performed if a plurality of F5 connections are aggregated into an F4 connection. Whenever a VCC cell is transmitted, the CCcount field in the F4 OAM connection context table is updated, preventing the VPC from entering a CCalarm condition, as aforesaid. If no VCC cells are transmitted on any of the VPC's VCCs, then the VPC is declared to be in CCalarm condition within 3.5±0.5 seconds.

DESCRIPTION

In order to support the F4-to-F5 OAM process, the ATM Layer device requires a context table to be maintained for each supported connection. This context table maintains connection state information and a host of programmable options for each connection. For example, OAM alarm bits for indicating various alarm conditions may be kept in the context table. Each connection may have its own unique context table, or groups of connections may have a common context table. When a connection enters the ATM Layer device, a pointer to that connection's context table is identified, facilitating access to the context table to provide further processing on that connection.

Figure 1:
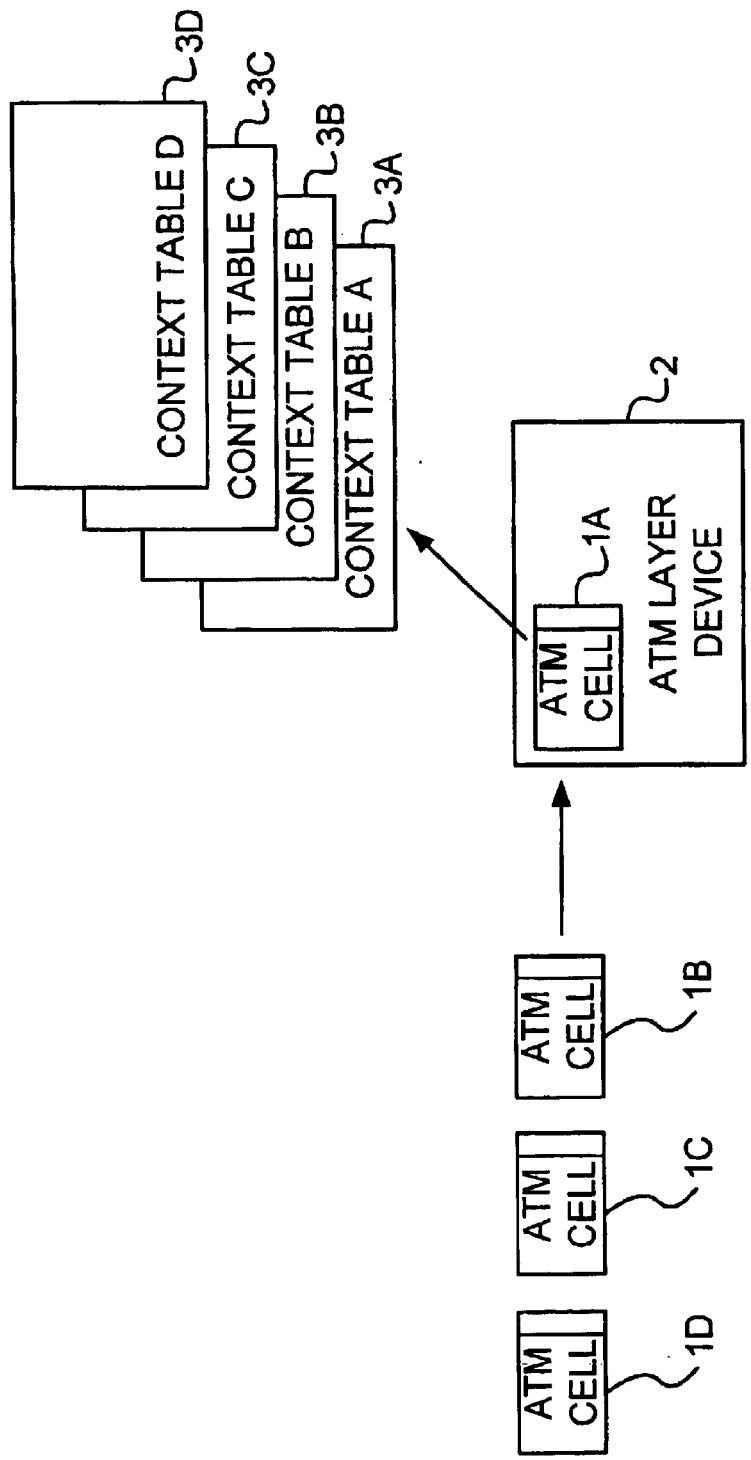
FIG. 1 is a block diagram which schematically illustrates allocation of a unique pointer-based context table, in accordance with the prior art, which occurs when a connection enters an ATM Layer device, in order to provide further processing on the connection.

More particularly, FIG. 1 depicts a sequence of ATM cells 1A, 1B, IC, 1D entering ATM Layer device 2. The ATM Layer device examines the header bytes of each sequentially received ATM cell to determine which one of a number of predefined context tables 3A, 3B, 3C, 3D corresponds to the particular ATM cell. ATM Layer device 2 then examines the ATM cell's corresponding context table to determine what type of processing to perform on the ATM cell. The context table is also used to store information such as alarm notifications, depending on the type of ATM cell that is received.

If ATM Layer device 2 is an ATM switch which terminates an F4 connection at an F4 connection end-point, the F4 connections which handle the segment and end-to-end OAM flows would have the same context table location (the segment OAM flow is identified by an ATM header with a virtual channel identifier VCI=3 and the end-to-end OAM flow has a VCI=4). All F5 connections which re bundled in the F4 connection also have their own unique context table locations, as illustrated in FIG. 2.

Figure 2:
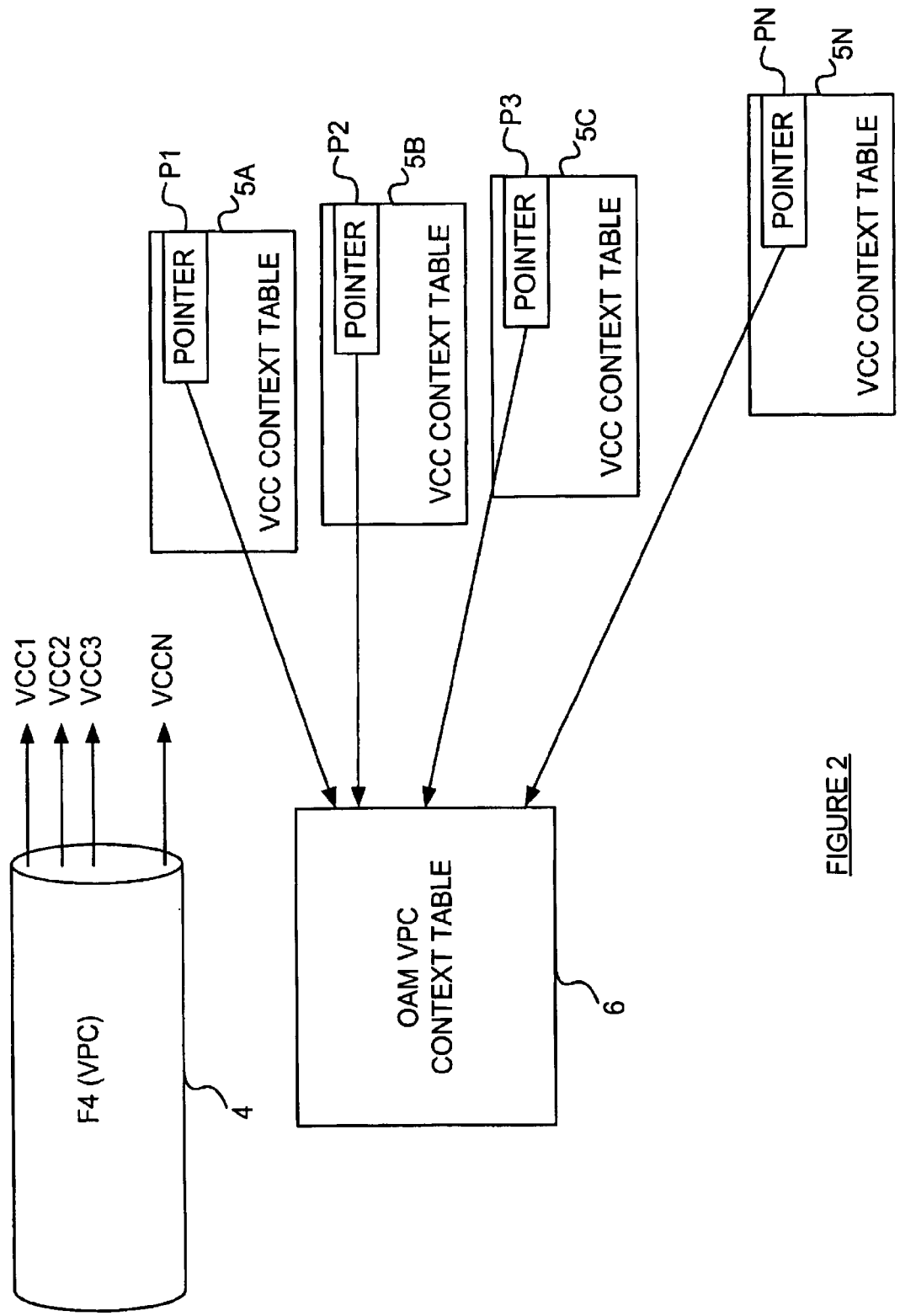
FIG. 2 is a block diagram which schematically illustrates allocation, in accordance with the invention, of a unique pointer-based context table to each F5 connection bundled in a single F4 connection terminated in an ATM device.

More particularly, FIG. 2 depicts the case in which a VPC 4 (F4 connection) is terminated in an ATM Layer device. n VCCs (VCC1, VCC2, ..., VCCn) are associated with VPC 4. A unique context table entry 5A, 5B, 5C, ..., 5N is provisioned for each VCC, and a separate context table entry 6 is provisioned for the segment and end-to-end OAM VPC.

When either a segment VPC-AIS or end-to-end VPC-AIS cell is received on the VPC OAM connection, the associated OAM alarm status bits (either segment, or end-to-end, or both) in that VPC OAM connection's context table are asserted, and the ATM Layer device notifies a management entity of the alarm status.

A pointer is maintained in each context table provisioned for each connection. More particularly, in the case of context tables 5A, 5B, 5C, ..., 5N provisioned for the VCCs, pointers P1, P2, P3, ..., PN respectively contain the address of context table 6 provisioned for the corresponding segment and end-to-end OAM VPC.

In order to satisfy the standards requirements for generation of VCC-AIS cells within 500 msec of receipt of a VP-AIS cell, a background process is executed by the ATM Layer device in respect of all connections supported by the ATM switching system. Specifically, once every 500 msec, all provisioned connections supported by the ATM switching system are scanned to examine each connection's context table and identify the connection type (i.e. VCC or VPC, as determined by a configuration bit provided in each context table). If the currently examined connection is a VCC whose F4-to-F5 OAM process is activated (as determined by a configuration field in the VCC context tables), then the F4 OAM flow pointer is extracted from that VCC's context table, thereby providing the address of the context table for the corresponding VPC OAM connection. If examination of the VPC OAM connection's context table reveals that the VPC OAM connection is in the VP-AIS alarm state (either segment or end-to-end, or both), then the currently examined VCC is caused to output a VCCAIS cell (segment or end-to-end or both, depending on the VP-AIS alarm state and whether or not the currently examined VCC is considered as part of a segment VCC flow, as determined by another configuration field within the currently examined VCC's context table). Since all of the foregoing processing is completed once every 500 msec for all provisioned connections supported by the ATM switching system, the 500 msec requirement of ITU-T I.610 and Bellcore GR-1248-CORE is satisfied. The background process, which is initiated every 500 msec by a counter which interrupts the ATM Layer processor, also initiates generation of VCC-AIS cells at a rate of one per second while the VPC(s) are in the VP-AIS alarm state.

Figure 4:
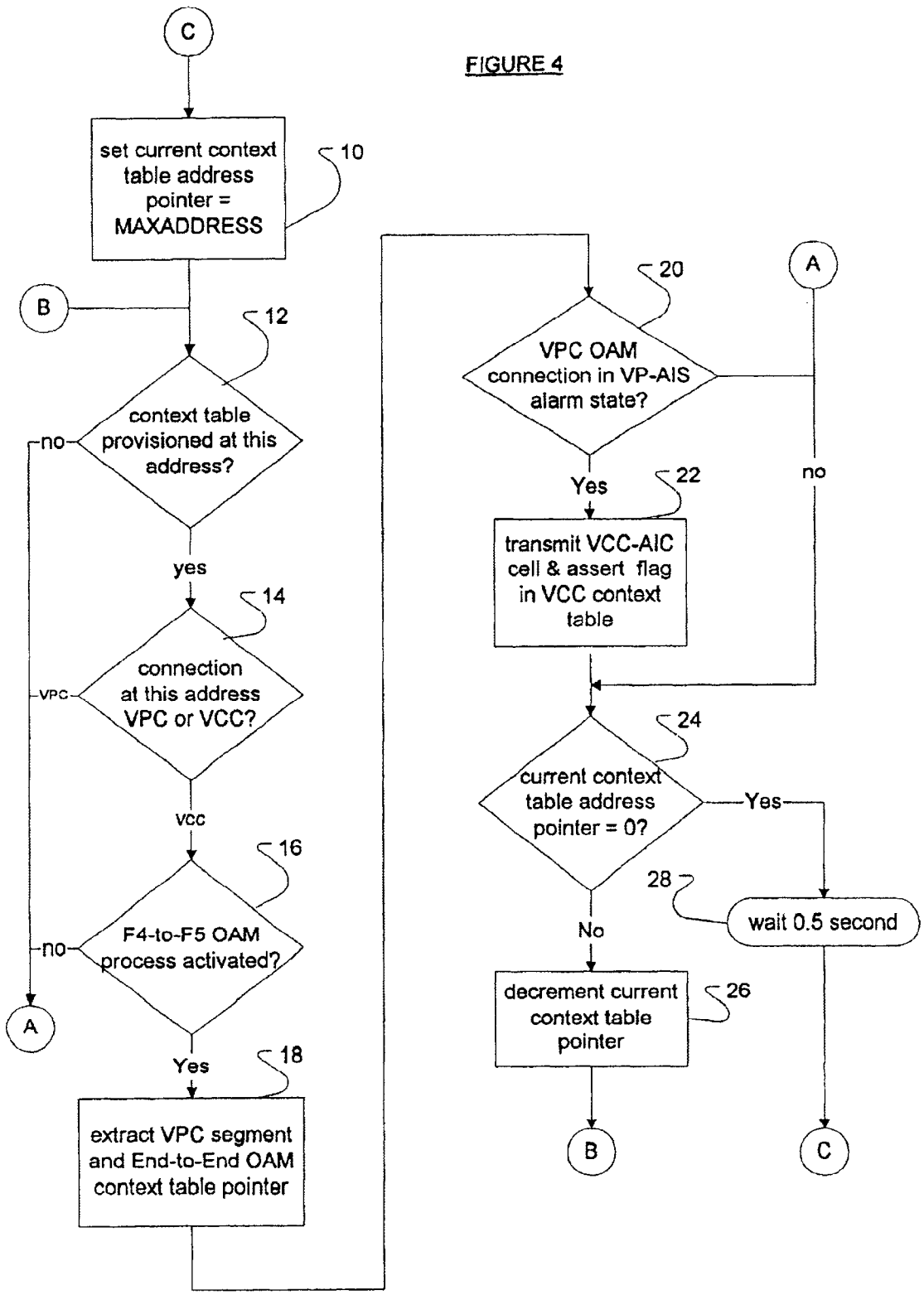
FIG. 4 is a flowchart depicting maintenance of the F5–F4 connections shown in FIG. 2.

FIG. 4 illustrates the aforementioned background process in more detail, in the form of a flowchart to which reference is now made. The current context table address pointer is initialized (block 10) to a value "MAXADDRESS", which is typically the maximum number of VCCs supported by the ATM switching system. A test (block 12) is then performed to determine whether the context table at the address pointed to by the current context table address pointer is provisioned. If the block 12 test reveals that the context table at the address pointed to by the current context table address pointer is not provisioned, then processing continues at block 24 as hereinafter explained. Otherwise, a further test (block 14) is performed to determine whether the provisioned connection corresponding to the context table at the address pointed to by the current context table address pointer is a VCC or VPC.

If the block 14 test reveals that the connection is a VPC, then processing continues at block 24 as hereinafter explained. Otherwise, in the case of a VCC, a further test (block 16) is performed to determine whether the F4-To-F5 OAM process is activated for that VCC. If the block 16 test reveals that the F4-To-F5 OAM process is not activated, then processing continues at block 24 as hereinafter explained. Otherwise, if the F4-To-F5 OAM process is activated, then the pointer to the context table for the corresponding VPC OAM connection is extracted (block 18) from the VCC's context table. The VPC OAM connection's context table is then examined to determine (block 20) whether the VPC OAM connection is in the VP-AIS alarm state.

If the VPC OAM connection is not in the VP-AIS alarm state then processing continues at block 24 as hereinafter explained. Otherwise, the appropriate VCC-AIS cell (segment, or end-to-end, or both) is output (block 22) and a bit flag in the VCC's context table is asserted to indicate generation of VCC-AIS cells due to the VPC being in the VP-AIS alarm state. This flag is used to ensure that VCC-AIS cells are generated only during every other background processing event. Consequently, VCC-AIS cells are generated at the required rate of one per second, since each background processing event lasts 500 msec.

When processing continues at block 24 as aforesaid, a test (block 24) is performed to determine whether the value of the current context table address pointer is equal to zero. If the pointer's value is non-zero then the pointer's value is decremented by one (block 26), and processing then continues at block 12 as previously explained. Otherwise, if the pointer's value is zero, a delay timer is started (block 28) to restart the background process in 500 msec by interrupting the ATM Layer processor.

Another background process is used to implement F4 and F5 continuity check procedures in accordance with the aforementioned standards. In particular, a continuity check alarm is raised if no user cell traffic or continuity check cell traffic is received for a period of 3.5±0.5 seconds. Specifically, whenever a VCC cell (which conforms to the definition of a VPC user cell, as defined in ITU-T I.610) is received on an F5 connection, the "CCcount" field of the corresponding F4 OAM connection is updated, preventing the F4 connection from raising a continuity check alarm ("CCalarm").

Figure 3:
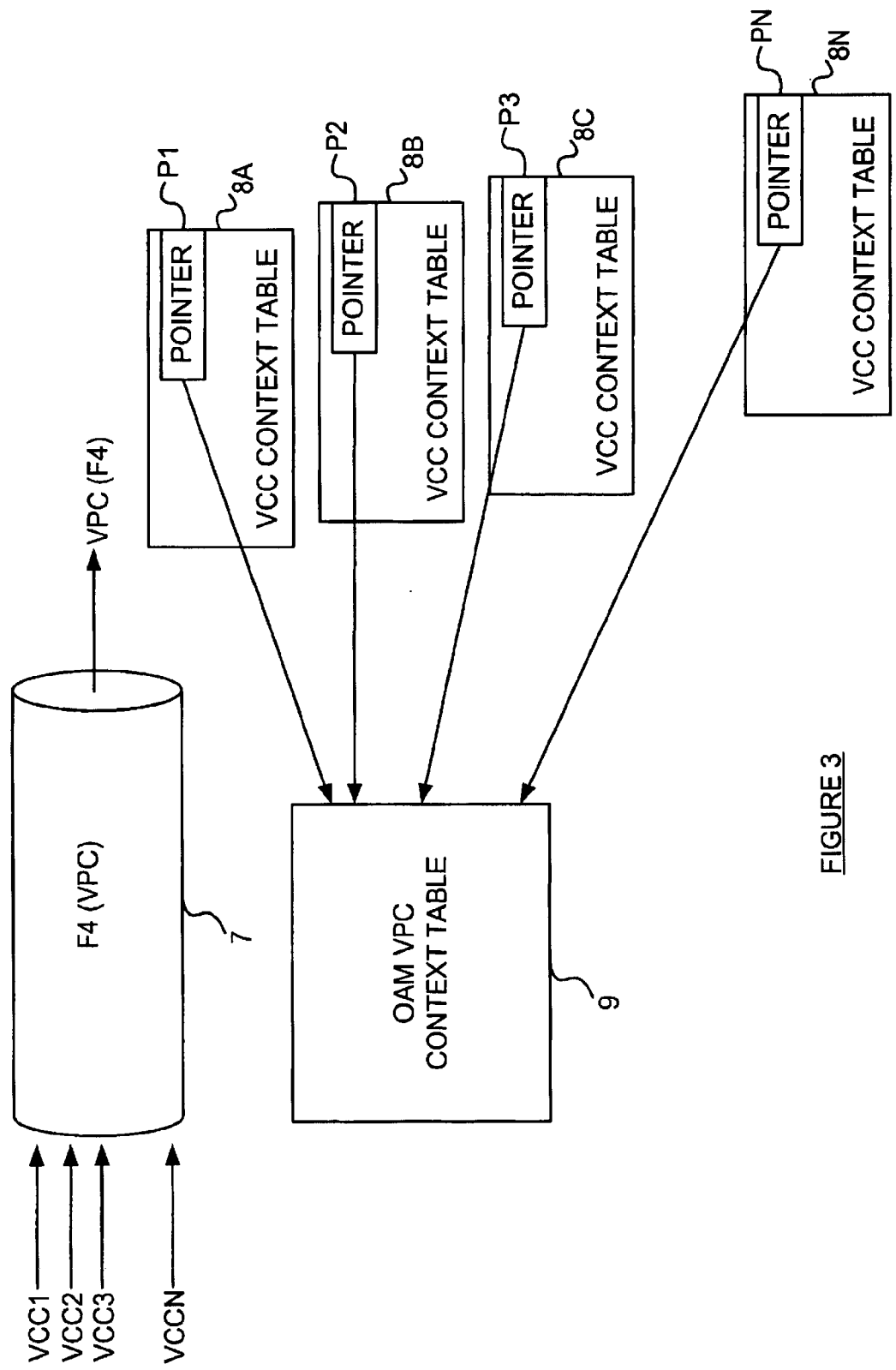
FIG. 3 is a block diagram which schematically illustrates allocation, in accordance with the invention, of a unique pointer-based context table to each one of a plurality of F5 connections aggregated into a single F4 connection.

A similar continuity check procedure must be implemented if a plurality of F5 (VCC) connections are aggregated into an F4 connection, as shown in FIG. 3. In this case, n VCCs, (VCC1, VCC2, ... VCCn) are aggregated into a single VPC 7 (F4 connection). As previously explained, a unique context table entry 8A, 8B, 8C, ..., 8N is provisioned for each VCC; a separate context table 9 is provisioned for VPC 7's segment and end-to-end OAM; and, the respective pointers P1, P2, P3, ..., PN in each of VCC context tables 8A, 8B, 8C, ..., 8N contain the address of context table 9. Whenever a VCC cell is transmitted, the CCcount field in VPC OAM context table 9 is updated, preventing VPC 7 from entering a CCalarm condition, as aforesaid. (Of course, the CCcount field in the VCC's context table is also updated whenever a VCC user cell is transmitted). If no VCC cells are transmitted on any of VPC 7's VCCs then VPC 7 must be declared to be in CCalarm condition within 3.5±0.5 seconds.

When a connection is initially provisioned, that connection's CCcount field is initialized to the value 3. The connection's CCcount field is reset to the value 3 whenever a user cell, or continuity check cell is transmitted on that connection. Whenever a cell (which conforms to the definition of a VPC user cell, as specified in ITU-T I.610 Table 1) is transmitted on a VCC, the VPC-pointer (P1, $P_2, \ldots P_n$ in FIG. 3) in the context table for that VCC is examined to determine whether or not the VCC is being aggregated into a VPC. If so, then the VPC OAM context table pointed to by the VPC-pointer is accessed, and the CCcount field in the VPC OAM context table is reset to 3. The value in the CCcount field is decremented, as hereinafter described. The continuity check background process is initiated once every 1,000 msec by a counter which interrupts the ATM Layer processor.

Figure 5:
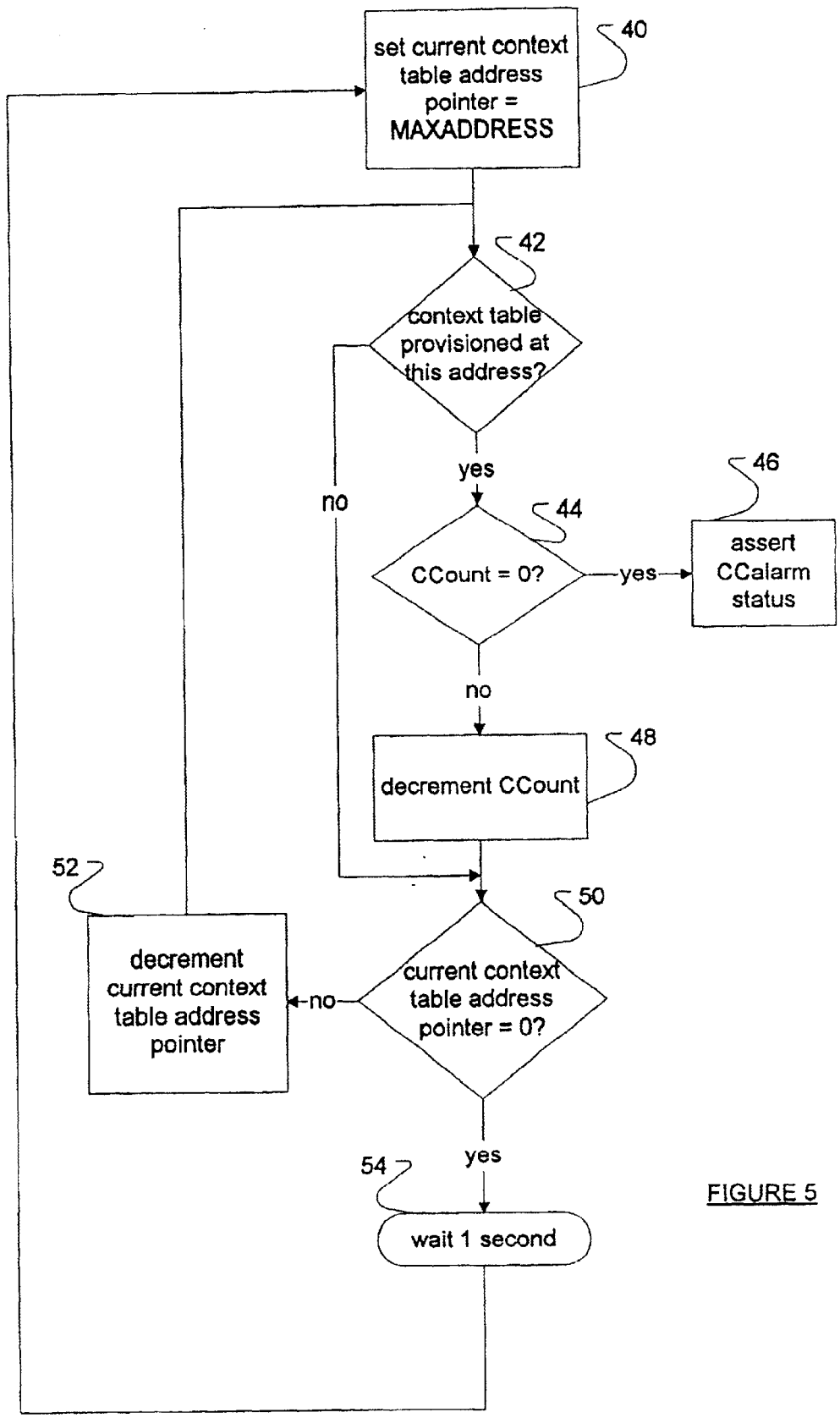
FIG. 5 is a flowchart depicting a continuity check procedure for the F5–F4 connections of FIG. 3.

FIG. 5 illustrates the aforementioned continuity check background process in more detail, in the form of a flowchart to which reference is now made. The current context table address pointer is initialized (block 40) to a value "MAXADDRESS" which is typically the maximum number of VCCs supported by the ATM switching system. A test (block 42) is then performed to determine whether the context table at the address pointed to by the current context table address pointer is provisioned.

If the block 42 test reveals that the context table at the address pointed to by the current context table address pointer is not provisioned then processing continues at block 50 as hereinafter explained. Otherwise, a further test (block 44) is performed to determine whether the value in the CCcount field of the context table at the address pointed to by the current context table address pointer is zero. If the CCcount field's value is zero then the CCalarm condition is declared (block 46).

If the CCcount field's value is non-zero, then the value in the CCcount field is decremented by one (block 48). A further test (block 50) is then performed to determine whether the value of the current context table address pointer is equal to zero. If the pointer's value is non-zero then the pointer's value is decremented by one (block 52), and processing then continues at block 42 as previously explained. Otherwise, if the pointer's value is zero, a delay timer is started (block 54) to restart the continuity check background process in 1,000 msec by interrupting the ATM Layer processor.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of identifying a segment and end-to-end OAM flow virtual path connection context table for any one of a plurality of virtual channel connections corresponding to said virtual path connection, said method comprising:

(a) providing a context table for each one of said virtual channel connections;

(b) providing, within each one of said virtual channel connection context tables, a pointer comprising an address identifying said virtual path connection context table;

(c) initializing a current context table address pointer for said virtual channel connection context tables to a value representative of a maximum number of supported virtual channel connections;

(d) determining whether one of said virtual channel connection context tables exists at an address corresponding to said current context table address pointer value;

(e) if one of said context tables exists at said address corresponding to said current context table address pointer value, determining whether said one of said context tables corresponds to one of said virtual channel connections or to said virtual path connection;

(f) if said one of said context tables corresponds to one of said virtual channel connections, determining whether an F4-To-F5 OAM process is activated for said one of said virtual channel connections;

(g) if said F4-To-F5 OAM process is activated for said one of said virtual channel connections, extracting said pointer identifying said virtual path connection context table from said context table for said one of said virtual channel connections and thereby accessing said virtual path connection context table to determine whether said virtual path connection is in a VP-AIS alarm state;

(h) if said virtual path connection is in said VP-AIS alarm state, transmitting a VCC-AIS cell and setting a flag indicative of said transmission;

(i) if none of said context tables exists at said address corresponding to said current context table address pointer value, or if said one of said context tables corresponds to said virtual path connection, or if said F4-To-F5 OAM process is not activated for said one of said virtual channel connections, or if said virtual path connection is not in said VP-AIS alarm state, determining whether said current context table address pointer value is zero;

(j) if said current context table address pointer value is not zero, decrementing said current context table address pointer value by one and repeating said method commencing with said determining whether one of said context tables exists; and, (k) if said current context table address pointer value is zero, waiting 500 msec and then repeating said method commencing with said initializing of said current context table address pointer.

2. A method of identifying a segment and end-to-end OAM flow virtual path connection context table for any one of a plurality of virtual channel connections corresponding to said virtual path connection, said method comprising:

(a) providing a context table for each one of said virtual channel connections;

(b) providing, within each one of said virtual channel connection context tables, a pointer comprising an address identifying said virtual path connection context table;

(c) initializing a pointer for said virtual channel connection context tables to a value representative of a maximum number of supported virtual channel connections;

(d) determining whether one of said virtual channel connection context tables exists at an address corresponding to said pointer value;

(e) if one of said virtual channel connection context tables exists at said address corresponding to said pointer value, determining whether a CCcount field value in said one of said virtual channel connection context tables is zero;

(f) if said CCcount field value is zero, asserting a CCalarm condition in respect of said virtual path connection;

(g) if said CCcount field value is not zero, decrementing said CCcount field value by one;

(h) if said pointer value is not zero, decrementing said pointer value by one and repeating said method commencing with said determining whether one of said virtual channel connection context tables exists at an address corresponding to said pointer value; and, (i) if said pointer value is zero, waiting 1,000 msec and then repeating said method commencing with said initializing of said pointer.

3. A method as defined in claim 1, wherein:

(a) said virtual channel connection context tables and said pointers are further provided within an ATM layer device which terminates said virtual path connection with OAM support; and, (b) said method is performed by a processor integral to said ATM layer device.

4. A method as defined in claim 2, wherein:

(a) said virtual channel connection context tables and said pointers are further provided within an ATM layer device which terminates said virtual path connection with OAM support; and, (b) said method is performed by a processor integral to said ATM layer device.

* * * * *